United States Patent [19]

Barry

[11] Patent Number: 5,255,368

[45] Date of Patent: Oct. 19, 1993

[54] METHOD FOR SELECTING DATA COMMUNICATIONS PATHS FOR ROUTING MESSAGES BETWEEN PROCESSORS IN A PARALLEL PROCESSING COMPUTER SYSTEM ORGANIZED AS A HYPERCUBE

[75] Inventor: Timothy G. Barry, Ft. Collins, Colo.

[73] Assignee: Hewlett-Packard Company, Palo Alto, Calif.

[21] Appl. No.: 747,037

[22] Filed: Aug. 19, 1991

[51] Int. Cl.⁵ .................... G06F 13/00; G06F 15/16
[52] U.S. Cl. .................... 395/200; 395/800; 364/DIG. 1; 364/284.3; 364/284; 364/229; 364/229.5; 364/228.7
[58] Field of Search ............ 395/650, 600, 700, 200, 395/800

[56] References Cited

U.S. PATENT DOCUMENTS

| | | | |
|---|---|---|---|
| 4,814,980 | 3/1989 | Peterson et al. | 364/200 |
| 5,105,424 | 4/1992 | Flaig et al. | 370/94.1 |
| 5,170,393 | 12/1992 | Peterson et al. | 370/94.1 |
| 5,170,482 | 12/1992 | Shu et al. | 395/800 |
| 5,212,773 | 5/1993 | Hillis | 395/200 |

OTHER PUBLICATIONS

Saad & Schultz, "Data Communication in Hypercubes", Technical Report Yaleu DCS RR-428, Yale Univ., Dept. of Computer Science, Oct. 1985.
Chou & Du, "Uni-directional Hypercubes", Technical Report TR89-62, Univ. of Minnesota, Computer Science Dept., Sep. 1989.
Heller, "Directed Cube Networks: A Practical Investigation", Technical Report CSG Memo 253, Massachusetts Institute of Technology, Computer Science Dept., (Jul. 1985.
Seitz, "The Cosmic Cube", *Communications of the ACM*, vol. 28, No. 1, Jan. 1985, pp,. 22-33.

*Primary Examiner*—Kevin A. Kriess

[57] ABSTRACT

A method of defining the direction for each data communication path that interconnect the processors, also called nodes, of a parallel processor computer system organized as a hypercube. The method computes a sum from the binary bits of the address of the node and if the sum is an odd number, the data communication path is defined as inbound. If the sum is an even number, the data communication path is defined as outbound. Also defined is a method, based only on local information, of routing messages between any two arbitrary nodes within the hypercube defined. The routing method forms a distance by exclusive or-ing the starting address with the destination address. The method then analyzes the bits of the distance to determine which data communication path to use when forwarding the message to the next node in the hypercube.

9 Claims, 14 Drawing Sheets

METHOD FOR SELECTING DATA COMMUNICATIONS PATHS FOR ROUTING MESSAGES BETWEEN PROCESSORS IN A PARALLEL PROCESSING COMPUTER SYSTEM ORGANIZED AS A HYPERCUBE

FIELD OF THE INVENTION

This invention relates to computer systems and more particularly to parallel processors within a computer system. Even more particularly, the invention relates to routing messages between parallel processors within a hypercube parallel processor computer system.

BACKGROUND OF THE INVENTION

Parallel data connections between processors within a computer system can be accomplished in various ways. One such way is called a hypercube, and can have various dimensions. An n-cube network of processors or nodes, called an n-dimensional hypercube, consists of $2^n$ identical nodes that are interconnected to each other so that each node has n neighbors. The nodes are given a binary number address and they are connected in such a manner that the binary number addresses between connected nodes differs in one and only one bit. FIG. 1 shows an example of a prior art hypercube where $n = 3$. As shown in FIG. 1, when $n = 3$, an n-cube can be represented as an ordinary cube in three dimensions where the vertices are the 8 ($2^3$) nodes of the 3-cube and the edges represent data communication paths between the nodes.

Hypercubes have shown to be superior over simpler interconnects because of faster communication between the nodes. In a Hypercube data transfers are performed by passing messages between nearest neighbors. Thus a data packet which must travel between a starting node and a destination node may cross a sequence of nodes between the starting and destination nodes.

A key disadvantage of the hypercube topology is the growth rate of the data communication path count between neighbors as n increases. As n increases, each node becomes more difficult to design and fabricate due to this increasing number of connections. This growth rate, coupled with pin limitations on VLSI chips, continues to seriously limit the scalability of the hypercube topology to massively parallel systems. Additionally, the inherent bi-directional nature of the data communication paths within the hypercube prevents it from being readily used with naturally unidirectional media, such as fiber-optic media. Most of the existing hypercube connected multi-processor systems use two physical data communication paths, one for transmitting data in each direction, to allow parallel transmission between two adjacent nodes of the hypercube.

There is a need in the art then for a method of defining a hypercube using single unidirectional data communication paths. There is a further need for a method of determining the data communication paths that must be traversed when sending a message from one node of the hypercube to a second node. The present invention meets these needs.

SUMMARY OF THE INVENTION

It is an aspect of the present invention to provide a method of defining the direction of the data communication paths in a parallel processing computer system organized as a unidirectional hypercube.

It is another aspect of the invention to provide a method of determining which data communication paths to traverse when sending a message from a starting node of the hypercube computer system to a destination node within the system.

The above and other aspects of the invention are accomplished in a method of defining the direction for each data communication path that interconnect the processors, also called nodes, of a parallel processor computer system that is organized as a hypercube. The method computes a sum from the binary bits of the address of the node and if the sum is an odd number, the data communication path will be inbound. If the sum is an even number, the data communication path will be outbound.

The invention also defines a method of routing messages between any two arbitrary nodes within the hypercube. The routing method is performed in each node as the message passes through the node. The method forms a destination path by exclusive or-ing the starting node address with the destination node address. The method then analyzes the bits of the destination path to determine which data communication path to use when forwarding the message to the next node in the hypercube. The routing method is based on local information only, and does not query other nodes to determine how they might route the message.

BRIEF DESCRIPTION OF THE DRAWINGS

The above and other aspects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Appendix 1, attached hereto and incorporated herein by reference for all that is disclosed therein, describes the mathematical foundations for the invention. The mathematical foundations are also disclosed in a Masters Thesis entitled "Optimal Diameter Unidirectional Hypercubes" published Aug. 21, 1990 at the University of Minnesota by the inventor hereof, also incorporated herein by reference for all that is disclosed therein.

Figure 1:
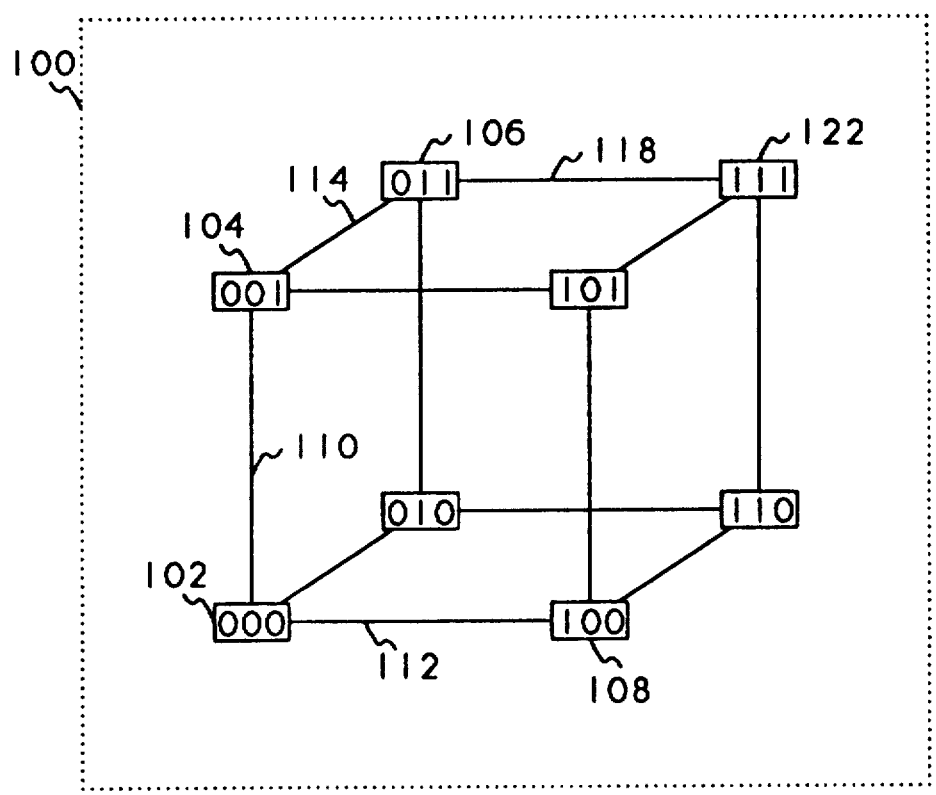
FIG. 1 shows a prior art bi-directional data path hypercube computer system.

As discussed above a hypercube consists of $2^n$ identical nodes that are interconnected to each other so that each node has n neighbors and the node addresses for each of the neighbors differs from the address of the node by only one binary bit. Referring now to FIG. 1, a hypercube computer system 100 contains a node 102 which has a binary address of 000. The node 102 represents a processor within the hypercube, which typically includes a processing element and associated random access memory. Typically a hypercube will also contain an input output processor, not shown in FIG. 1, which performs communications with a user of the system and which also contains data storage devices such as disks or tapes.

The hypercube of FIG. 1 is a 3-cube, which contains $2^3$ or 8 elements. Each node is connected to three other nodes using a bi-directional data communication path. For example, node 102 is connected to node 104 through a bi-directional data communications path 110, node 102 is also connected node 106 through a bi-directional data communication path 114, and node 102 is connected to node 108 through a bi-directional data communication path 112. Note that node 104 has a binary address of 001 which differs from the binary address 000 of node 102 by only 1 bit. Also, node 108 has a binary address 100 which also differs from the binary address 000 of node 102 by 1 bit. Likewise, node 106 has an address of 011, which differs from the address of node 104 by only one bit.

In a hypercube having bi-directional data communication paths, such as the hypercube of FIG. 1, the number of paths through which a message must pass when going from one of the nodes to another of the nodes, is at most n paths, in an n-cube. For example, to send a message from node 102 to node 122 in FIG. 1, the message must pass through data communication path 110 to node 104, then through data communication path 114 to node 106, and then through data communication path 118 through node 122.

The present invention will first define a method of constructing a hypercube having unidirectional data communication paths, and then define a method of determining which data communication paths must be traversed to send a message from one node to another within a hypercube, including the hypercube thus defined.

Figure 2:
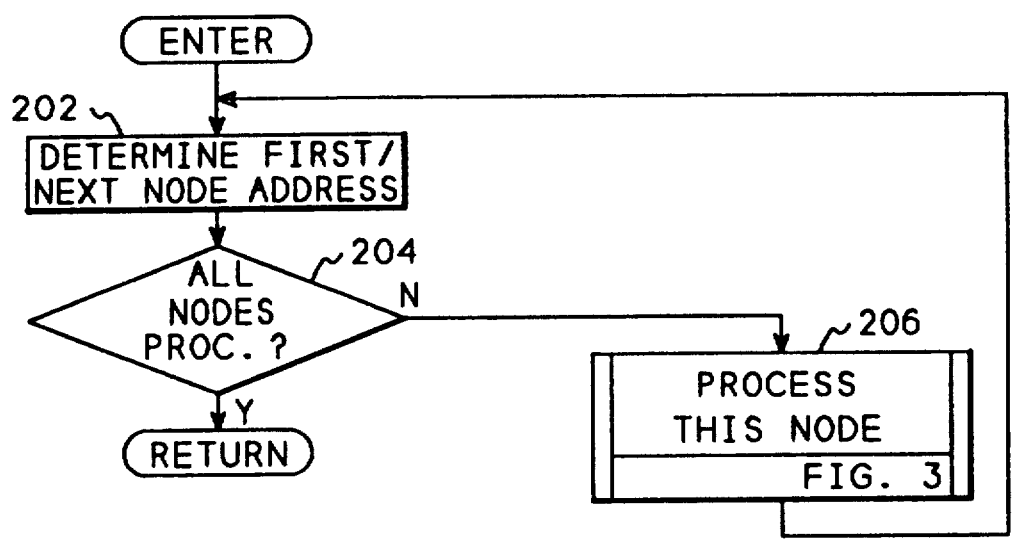
FIGS. 2 and 3 shows a method for defining the direction of data paths within a unidirectional hypercube computer system.
Figure 3:
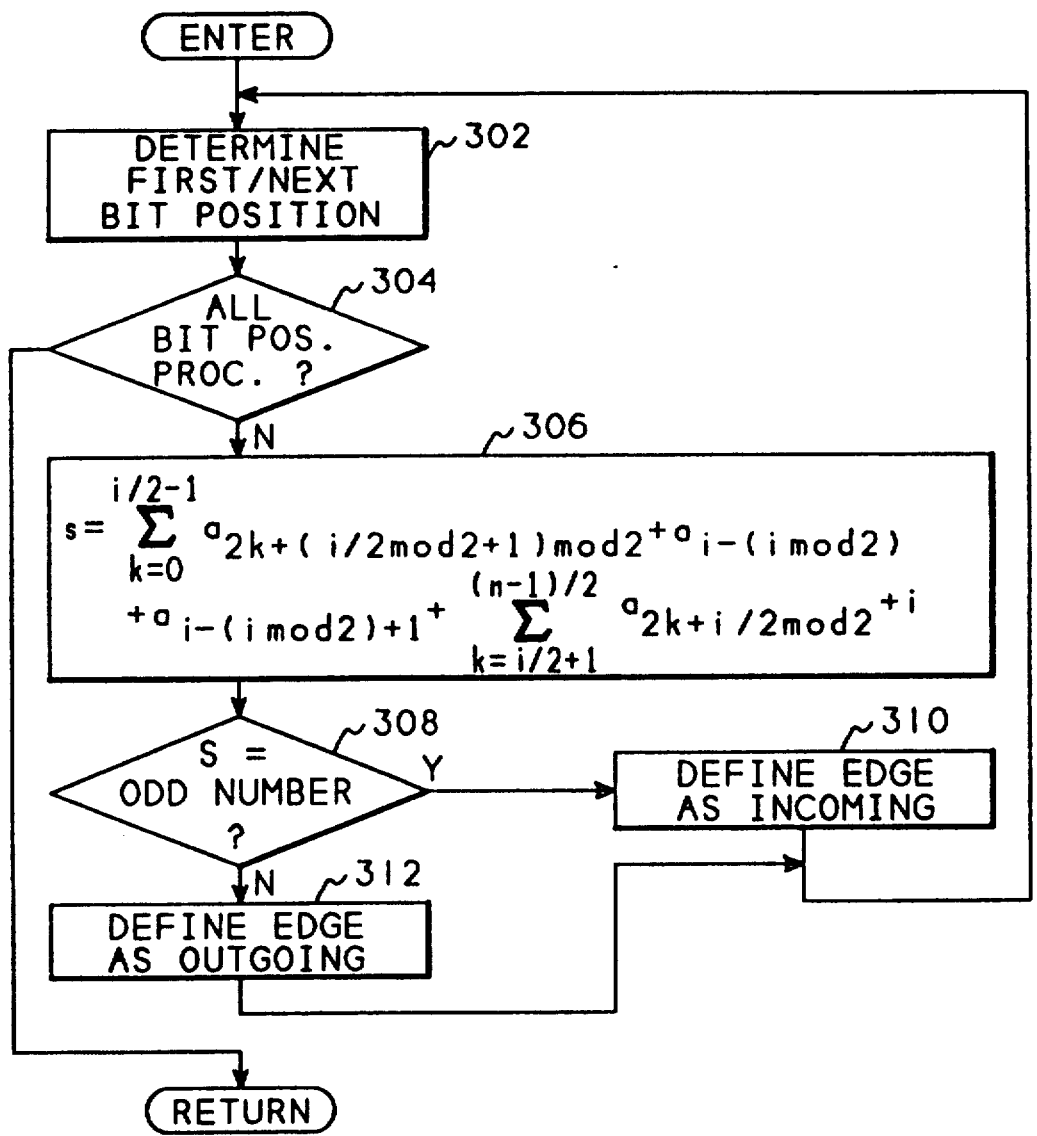

The key disadvantage of the hypercube topology is the growth rate of the data communication path count and node degree as n increases. This growth rate, coupled with pin limitations on VLSI chips, continues to seriously limit the scalability of the hypercube topology to massively parallel systems. Additionally, the inherent bi-directional nature of the hypercube prevents it from being readily used with naturally unidirectional media, such as fiber-optic media. Most of the existing hypercube connected multi-processor systems use two physical data communication paths, to allow parallel transmission between two adjacent nodes of the hypercube. FIGS. 2 and 3 show a flowchart of the method of the present invention for defining the direction of unidirectional data communication paths within a hypercube. This method can be used when designing a hypercube. FIG. 3 can also be used within a node of an existing hypercube to program the direction of the data communication paths when such data paths can be switched from one direction to the other.

Referring now to FIGS. 2 and 3, after entry, block 202 determines the first or next node address within the hypercube that needs to have its data communication paths defined. Block 204 determines if all nodes have been processed, and if not, transfers to block 206. Block 206 calls FIG. 3 to determine the directions of the data communication paths from the node address.

In FIG. 3, block 302 determines the first or next bit position that needs to be processed. In a hypercube, there is one data communication path corresponding to each binary bit position of the address of the node. For example, in a 3-cube, there are three data communication paths connected to each node, and each node has a three bit binary address.

After determining the next bit position to be processed, block 302 goes to block 304 which determines if all bit positions have been processed, and if not, control transfers to block 306 which computes a sum, s, using the following equation:

$$s = \sum_{k=0}^{i/2-1} a_{2k+(i/2\bmod 2 + 1)\bmod 2} + a_{i-(i\bmod 2)} + a_{i-(i\bmod 2)+1} +$$

$$\sum_{k=i/2+1}^{(n-1)/2} a_{2k+i/2\bmod 2} + i$$

In the above equation, i represents the bit position, and a represents the address of the node, where $a_x$ is the bit value of bit position x, counting from the right, within the address a. After block 306 determines the value of the variable s, block 308 determines whether s is an odd number. If s is an odd number, block 308 transfers to block 310 which defines the data communication path for the edge as an incoming data communication path before returning to block 302 to check the next bit position. If the method of FIG. 3 is being performed within a node of a hypercube, block 310 programs the direction of the data communication path before returning to block 302.

If s is an even number, block 308 transfers to block 312 which defines the data communication path as an outgoing data communication path and then returns to block 302 to determine the next bit position. If the method of FIG. 3 is being performed within a node of a hypercube, block 312 programs the direction of the data communication path before returning to block 302.

Those skilled in the art will recognize that either odd or even values for s could be used to define either inbound or outbound data paths.

After all bit positions have been determined within the address for this node, block 302 returns to FIG. 2, block 202 which gets the next node address and computes the data communication paths for that node. After all nodes have been processed, block 204 returns to the caller of FIG. 2.

Figure 4:
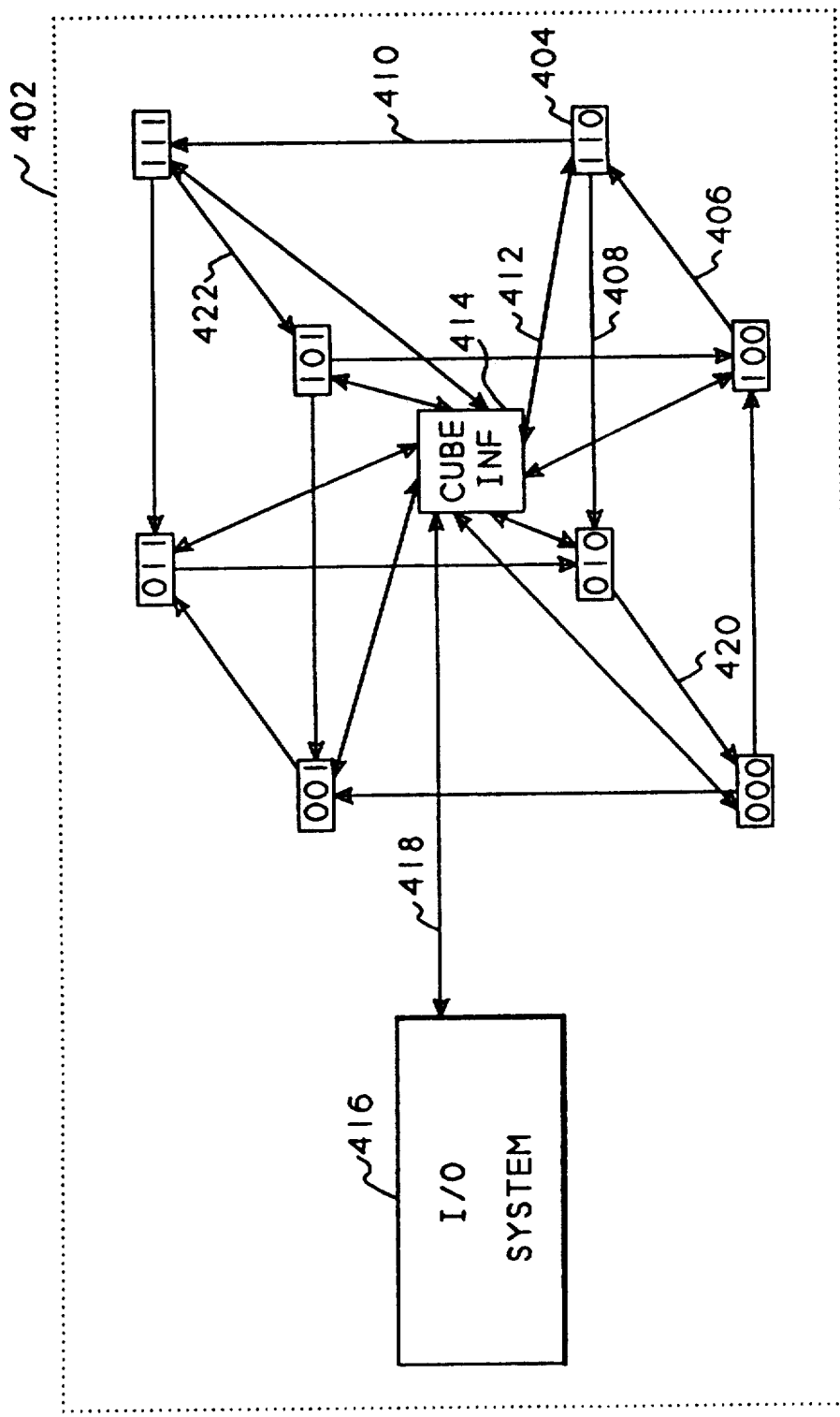
FIG. 4 shows a hypercube having eight processors with directional data paths as defined by the method of FIGS. 2 and 3.

FIG. 4 shows a hypercube system having eight nodes or processors with directional paths as defined by the method of FIGS. 2 and 3. Referring now to FIG. 4, a hypercube system 402 contains eight identical nodes, typically represented by node 404 which has an address 110. The system of FIG. 4 is a 3-cube, therefore, each nodes connects to three other nodes through three data communication paths or edges. For example, node 404 has data communication paths 406, 408, and 410. Also, each of the nodes of the hypercube has a bi-directional data communication path which connects to a cube interface module 414, which in turn connects to an I/0 system processor 416 to allow the hypercube to store data and communicate with users of the system. The following is an example of computing the directions of the data communication paths 406, 408, and 410 for the node 404 of FIG. 4 using the formula from block 306 of FIG. 3:

For data communication path 410 (bit zero of the node address):

$$s = \sum_{k=0}^{-1} a_{2k+1} + a_0 + a_1 + \sum_{k=1}^{1} a_{2k} + 0$$

$$s = a_0 + a_1 + a_2 + 0$$

$$s = 0 + 1 + 1 + 0$$

$$s = 2$$

since s is even, communication path 410 is outgoing.
For data communication path 406 (bit one of the node address):

$$s = \sum_{k=0}^{-1} a_{2k+1} + a_0 + a_1 + \sum_{k=1}^{1} a_k + 1$$

$$s = a_0 + a_1 + a_2 + 1$$

$$s = 0 + 1 + 1 + 1$$

$$s = 3$$

since s is odd, communication path 406 is incoming.
For data communication path 408 (bit two of the node address):

$$s = \sum_{k=0}^{0} a_{2k} + a_1 + a_2 + \sum_{k=2}^{1} a_{2k} + 2$$

$$s = a_1 + a_2 + 2$$

$$s = 1 + 1 + 2$$

$$s = 4$$

since s is communication path 408 is outgoing.

Figure 5:
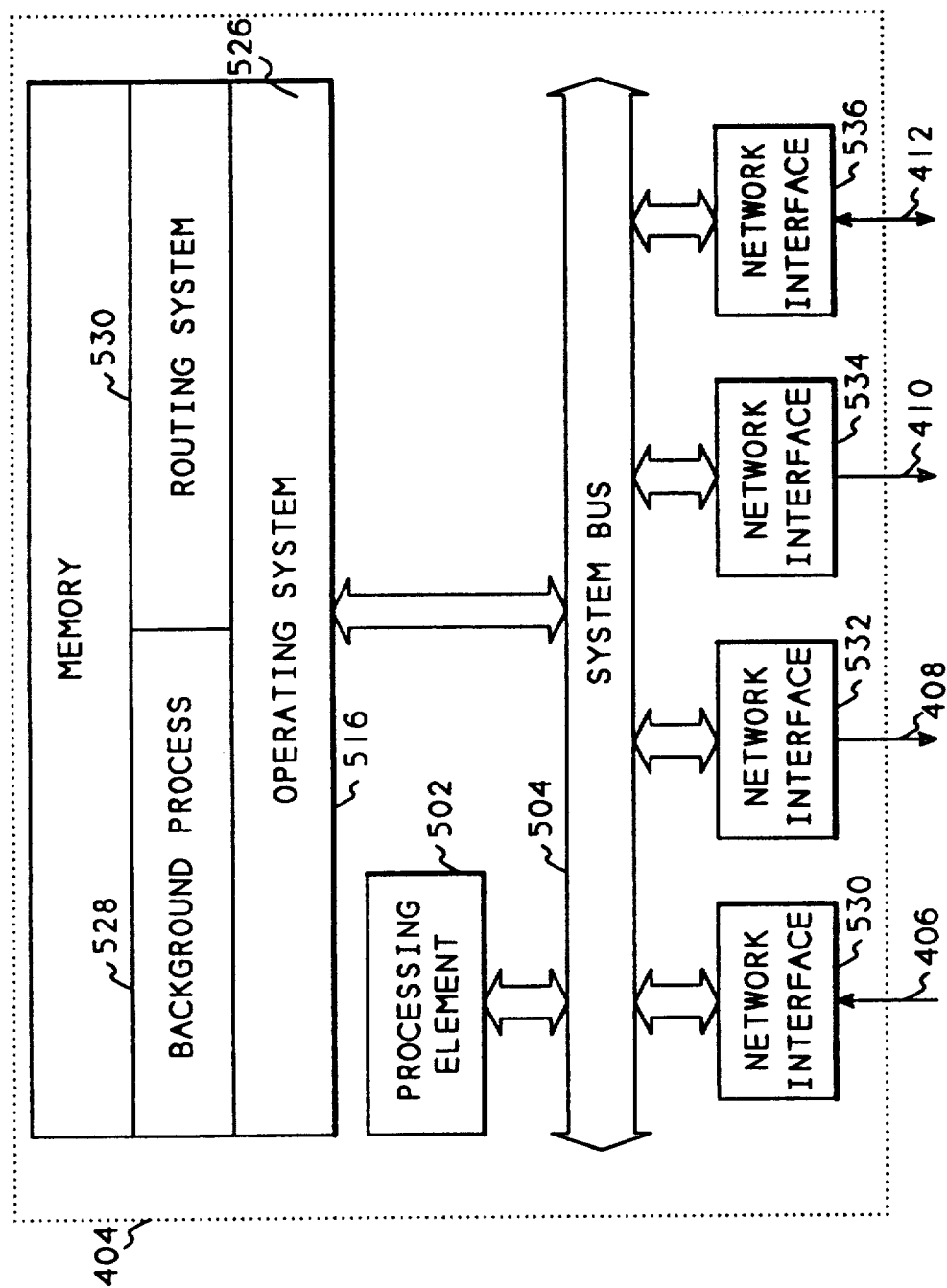
FIG. 5 shows a block diagram of one of the identical parallel processors within the hypercube of FIG. 4.

FIG. 5 shows a block diagram of the electronics of node 404 of FIG. 4. Referring now to FIG. 5, the processor 404 contains a processing element 502 which is connected to other parts of the system over a system bus 504. Connected to the system bus 504 are four network interface electronic modules 530, 532, 534, and 536, which provide the interface to the data communication paths 406, 408, 410, and 412 respectively. The interface between the system bus 504 and the network interfaces 530, 532, and 534 is bi-directional, to allow the system bus 504 to send and receive status information, even though the interfaces 406, 408, and 410 are uni-directional. Also connected to the system bus 504 is memory 516 which contains an operating system 526 routing system software 530 and background process software 528.

The routing system software 530 will be described below with respect to FIG. 7 through 14. When the routing system software 530 determines that a message addressed to this node has arrived, it passes that message to the background process 528 which processes the message and may or may not return a reply message to the routing system 530.

Figure 6:
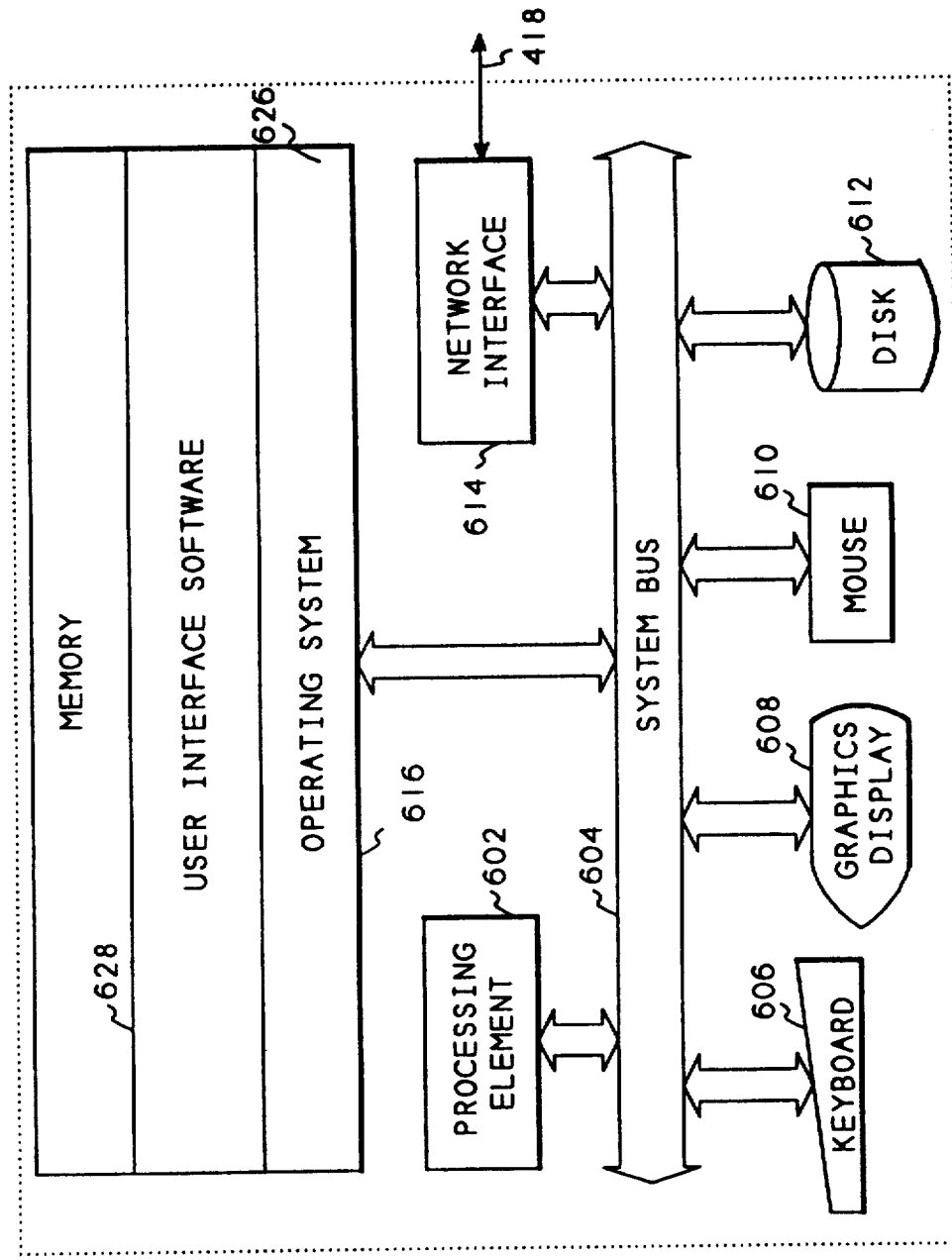
FIG. 6 shows a block diagram of the input/output (I/0) processor of the system of FIG. 4.
Figure 7:
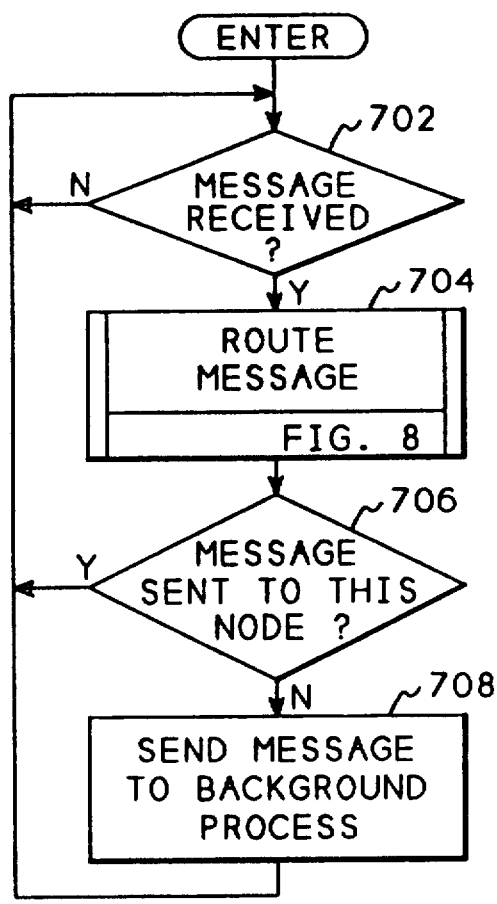
FIGS. 7-14 show a flowchart of the routing method of the present invention for routing messages between the parallel processors of the system defined by FIGS. 2 and 3.

FIG. 6 shows a block diagram of the I/O system processor 416 of FIG. 4. Referring now to FIG. 6, the I/O system processor 416 contains a processing element 602 which is connected to other elements of the system through a system bus 604. Also attached to the system bus 604 is a keyboard 606, a graphics display 60B, and a mouse interface 610 which are used to allow the I/0 system 416 to interface to a user of the computer system. A disk 612 is used to store software and data for the entire system. A network interface 614 is used to interface to the cube interface 414 which in turn interfaces to all of the processors within the hypercube. A memory 616 contains an operating system 626 and user interface software 628. The user interface software 628 is used to allow a user of the system to interact with the processors of the hypercube.

FIGS. 7-14 show a flowchart of the routing system software 530 (FIG. 5) which is used for routing messages between the processors of the hypercube shown in FIG. 4. This software runs in each processor to route a message from a processor to the next processor that the software determines is closer to the message destination. The software relies on information local to the processor. That is, it does not query other processors about possible routes, instead it determines the best route and sends the message along that route. As the message travels along the route to a destination, the message encounters the same software in each processor. This software uses the source and destination addresses of the processors and the distance pattern formed at each subsequent processor along the route to find the next data communication path necessary to reach the destination.

Referring now to FIGS. 7-14, block 702 determines whether a message has been received from one of the network interfaces 530, 532, or 534. If a message has not been received, block 702 loops back on itself until such time as a message is received. Block 702 also determines whether a message has been received from the background process to send to some other node within the hypercube. When a message is received, block 702 transfers to block 704 which calls the route message software of FIG. 8. The route message software of FIG. 8 determines which node to send the message to next, and it also determines whether the message is intended for this node. After returning from the route message software of FIG. 8, block 706 determines whether the message received is intended for this node. If the message is not intended for this node, block 706 transfers back to block 702 since the message has already been sent on by the route message software of FIG. 8. If the message has been sent to this node, block 706 transfers to block 708 which sends the message to the background process 528 for processing before returning to block 702 to receive the next message.

Figure 8:
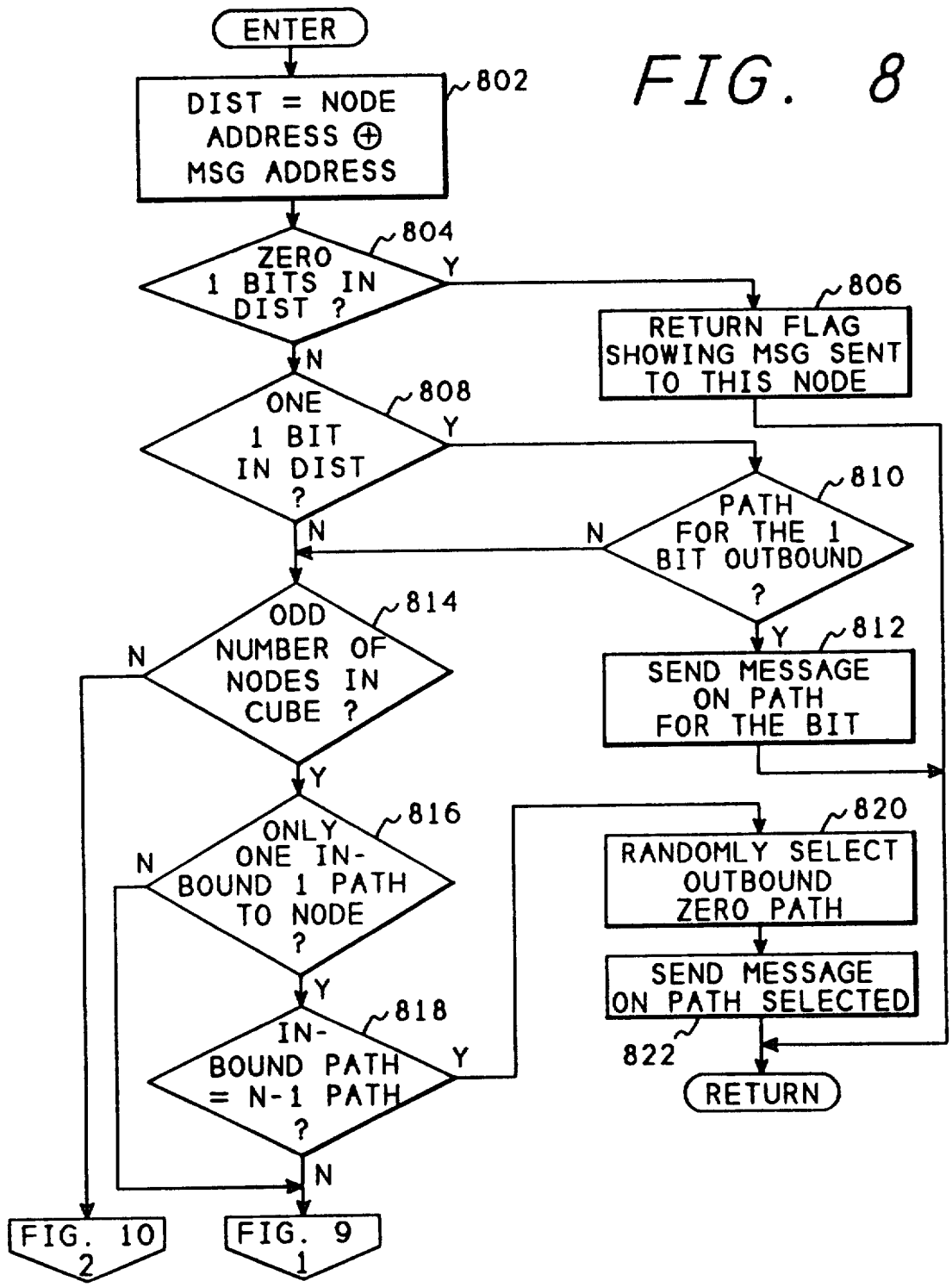

When block 704 calls FIG. 8, FIG. 8 is entered at block 802. Block 802 computes the value of a variable DIST as the node address of the node where the software is running, exclusive or-ed with the destination node address. Therefore, DIST is the Hamming distance between this node and the destination node. After computing the value of DIST, block 802 transfers to block 804 which determines whether there are any one bits within the variable DIST. If there are no one bits in DIST, then the message is being sent to this node, so block 804 transfers to block 806 which returns a flag showing that the message has arrived at its destination. If there is at least one 1 bit in DIST, block 804 transfers to block 808 which determines whether there is exactly one binary 1 bit in DIST. If there is exactly one 1 bit within DIST, block 804 transfers to block 81 which determines the corresponding data communication path for the bit. As discussed above with respect to FIG. 4, each data communication path connected to the node corresponds to one of the bit positions within the address of the node. Block 810 determines which bit is a one in DIST, and checks the corresponding path to determine whether that path is an outbound path. If that data communication path is outbound, then the message should be routed on that path so block 810 transfers to block B12 whioh sends the message on the data communication path corresponding to the one bit within DIST before returning to FIG. 7.

If the data communication path for the bit is not outbound, or if there is more than one 1 bit in DIST, control goes to block 814 which determines whether there is an odd number of dimensions in the cube. If the cube does have an odd number of dimensions, such as, for example, the 3-cube of FIG. 4, block 814 transfers to block 816 which determines whether there is only one inbound 1 path to the node. This test only checks the data communication path to or from the other nodes within the hypercube, and ignores the data communication path that leads to the I/O system 416 within the hypercube. If there is only one inbound 1 data communication path to the node, block 816 transfers to block 818 which determines whether the inbound data communication path corresponds to the n-1 path, where n is the dimension of the cube. For example, in the hypercube of FIG. 4, node 404, this test would determine whether the inbound path corresponds to the second path. If the inbound path does correspond to the n-1 path, block 818 transfers to block 820 which randomly selects an outbound path corresponding to a zero bit within DIST. After randomly selecting an outbound path, block 820 transfers to block 822 which sends the message on the data communication path selected.

Figure 9:
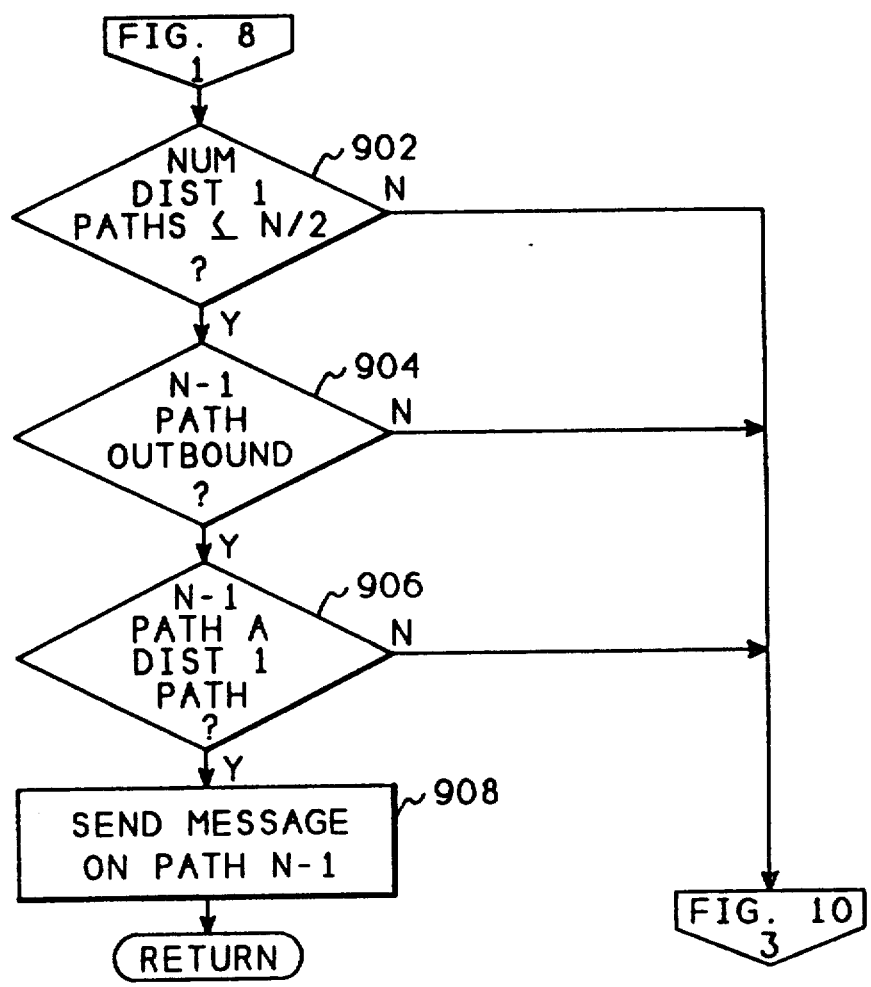
Figure 10:
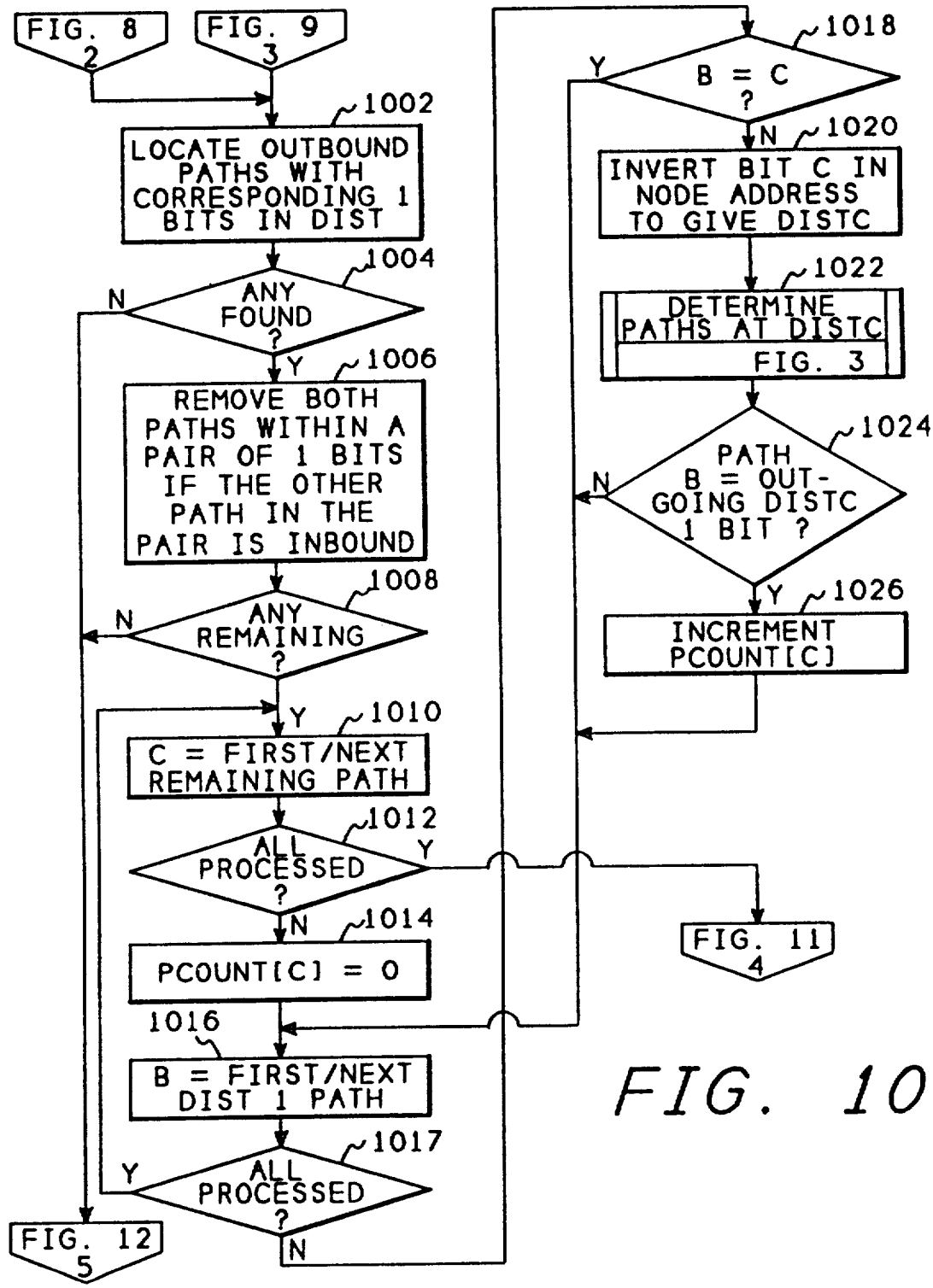

If there is more than one inbound data communication path to the node, or if the inbound path is not the n-1 path, control transfers to FIG. 9 block 902. Block 902 determines whether the number of one bits within DIST is less than or equal to n/2, where n is the dimension of the cube. If this is true, block 902 transfers to block 904 which determines whether the n-1 data communication path is outbound. If this is also true, block 904 transfers to block 906 which determines whether the n-1 data communication path corresponds to a one bit within DIST, and if so, block 906 transfers to block 908 which sends the message on the n-1 data communication path. If any of the above tests are false, FIG. 9 transfers to FIG. 10 block 1002. Also, if the dimension of the cube is an even number, control also transfers to FIG. 10 block 1002.

Block 1002 creates a list of all the outbound data communication paths from the node which have a corresponding one bit in DIST. Block 1004 then determines whether any were found and if not, transfers to FIG. 12 block 1202. If some outbound data communication paths with corresponding one bits in DIST were found, block 1004 transfers to block 1006 which removes from the list all data communication paths within a pair of one bits in DIST. Pairs are defined by taking the bits within the address starting at the right end of the address and grouping the bits into pairs. Control then transfers to block 1008 which determines whether any data communication paths remain in the list and if not, control is transferred to FIG. 12 block 1202. If at least one data communication path does remain in the list, block 1008 transfers to block 1010 which sets the value of a variable C to the first remaining data communication path in the list. Transfers back to this block from block 1? 17 will get the next remaining data communication path from the list. Block 1012 then determines whether all data communication paths have been processed, and if all data communication paths have been processed, block 1012 transfers to FIG. 11 block 1102. If at least one data communication path remains to be processed, block 1012 transfers to block 1014 which sets the value of a variable pcount[C] equal to zero. Block 1016 then sets the value of a variable B to the first data communication path within the list which corresponds to a one bit within DIST. Transfers back to this block will get the next remaining data communication path within the list which corresponds to a one bit within DIST. Block 1017 determines if all the data communication paths have been processed, and if so, transfers to block 1010. If at least one path remains to be processed, block 1017 transfers to block 1018. Block 1018 then determines if the variable B represents the same data communication path as the variable C, and if they are equal, control transfers back to block 1016 to ignore this data communication path. If B is not equal to C, block 1018 transfers to block 1020 which inverts bit C within the node address to create a new destination address DISTC. Block 1022 then calls FIG. 3 to determine the data communication paths that will exist from the node represented by DISTC. After returning from FIG. 3, block 1024 determines whether data communication path B at the node represented by the address DISTC will be an outgoing data communication path and also whether it corresponds to a one bit within DISTC. If neither of these is true, block 1024 transfers to block 1016 to ignore this data communication path. If data communication path B is outgoing and corresponds to a one bit in DISTC, block 1024 transfers to block 1026 which increments the value of pcount[C] before transferring back to block 1016 to process the next data communication path.

Figure 11:
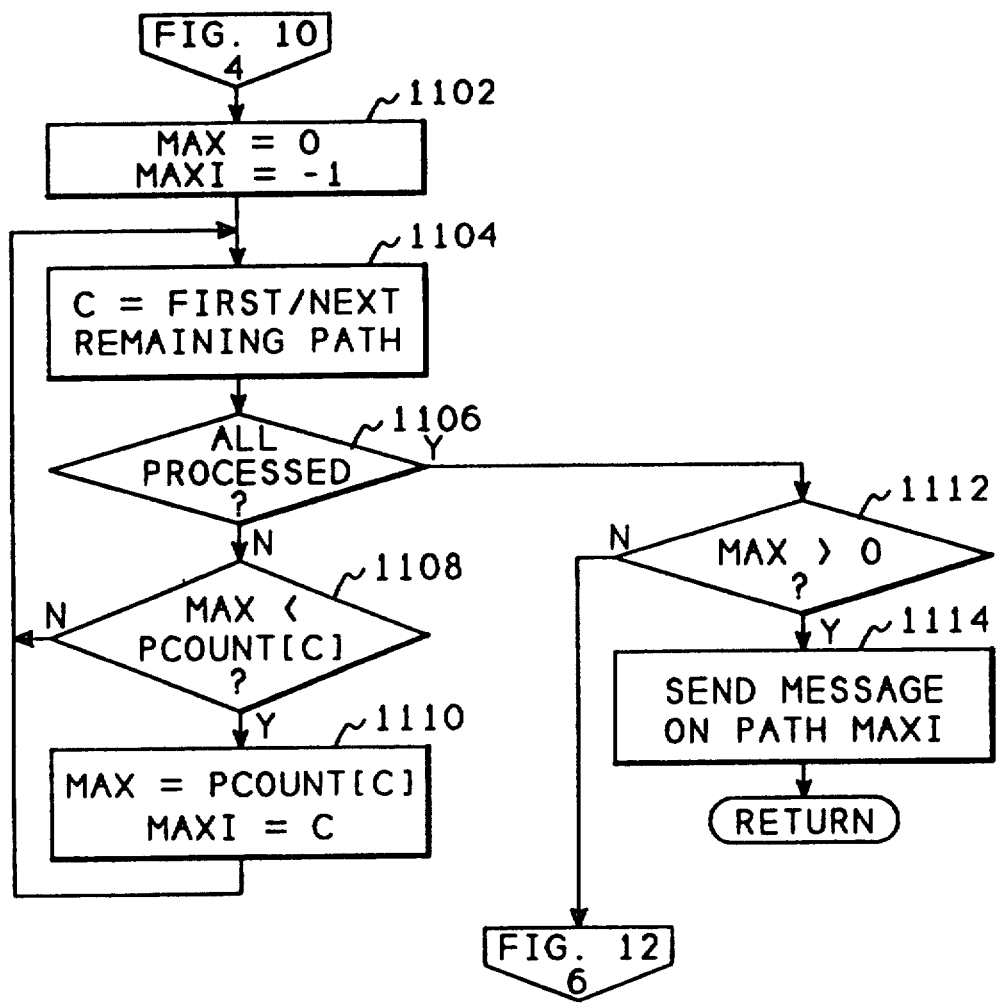
Figure 12:
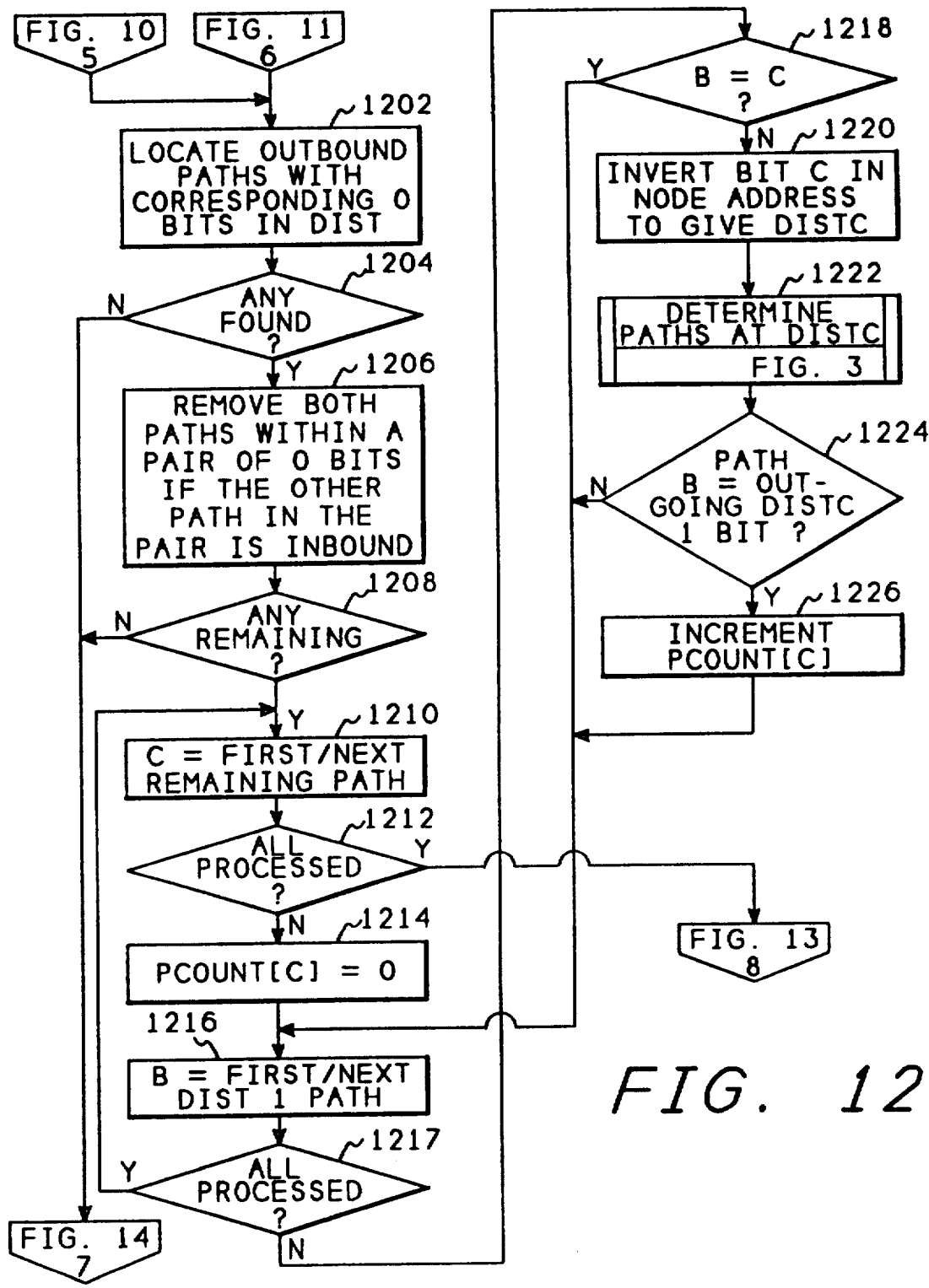

After all data communication paths have been processed, block 1012 transfers to FIG. 11 block 1102. Block 1102 sets the value of a variable MAX to zero and the variable MAXI to −1. Block 1104 then sets the value of the variable C to the first or next remaining data communication path within the list created by blocks 1002 and 1006. Block 1106 then determines if all data communication paths have been processed and if not, transfers to block 1108 which determines whether the value of the variable MAX is less than the value of the pcount[C]. If MAX is less than pcount[C], block 1108 transfers to block 1110 which sets MAX equal to the value of pcount[C], and also sets MAXI equal to C before returning to block 1104. After all data communication paths have been processed, block 1106 transfers to block 1112 which determines whether MAX is greater than zero, that is, did any of the data communication paths satisfy the tests of block 1010 through block 1026. If MAX is not greater than zero, block 1112 transfers to FIG. 12 block 1202. If MAX is greater than zero, block 1112 transfers to block 1114 which sends the message on the data communication path defined by the variable MAXI before returning.

Block 1202 creates a list of all the outbound data communication paths from the node which have a corresponding zero bit in DIST. Block 1204 then determines whether any were found and if not, transfers to FIG. 14 block 1402. If some outbound data communication paths with corresponding zero bits in DIST were found, block 1204 transfers to block 1206 which removes from the list all data communication paths within a pair of one bits in DIST. Pairs are defined by taking the bits within the address starting at the right end of the address and grouping the bits into pairs. Control then transfers to block 1208 which determines whether any data communication paths remain in the list and if not, control is transferred to FIG. 14 block 1402. If at least one data communication path does remain in the list, block 1208 transfers to block 121? which sets the value of a variable C to the first remaining data communication path in the list. Transfers back to this block will get the next remaining data communication path within the list which corresponds to a one bit within DIST. Block 1212 then determines whether all data communication paths have been processed, and if all data communication paths have been processed, block 1212 transfers to FIG. 13 block 1302. If at least one data communication path remains to be processed, block 1212 transfers to block 1214 which sets the value of a variable pcount[C] equal to zero. Block 1216 then sets the value of a variable B to the first data communication path within the list which corresponds to a one bit within DIST. Transfers back to this block will get the next remaining data communication path within the list which corresponds to a one bit within DIST. Block 1217 then determines if all the paths have been processed and, if so, transfers back to block 1210. If paths remain to be processed, block 1217 transfers to block 1218. Block 121 then determines if the variable B represents the same data communication path as the variable C, and if they are equal, control transfers back to block 1216 to ignore this data communication path. If B is not equal to C, block 1218 transfers to block 1220 which inverts bit C within the node address to create new destination address DISTC. Block 1222 then calls FIG. 3 to determine the data communication paths that will exist from the node represented by DISTC. After returning from FIG. 3, block 1224 determines whether data communication path B at the node represented by the address DISTC will be an outgoing data communication path and also whether it corresponds to a one bit within DISTC. If neither of these is true, block 1224 transfers to block 1216 to ignore this data communication path. If data communication path B is outgoing and corresponds to a one bit in DISTC, block 1224 transfers to block 1226 which increments the value of pcount[C] before transferring back to block 1210 to process the next data communication path.

Figure 13:
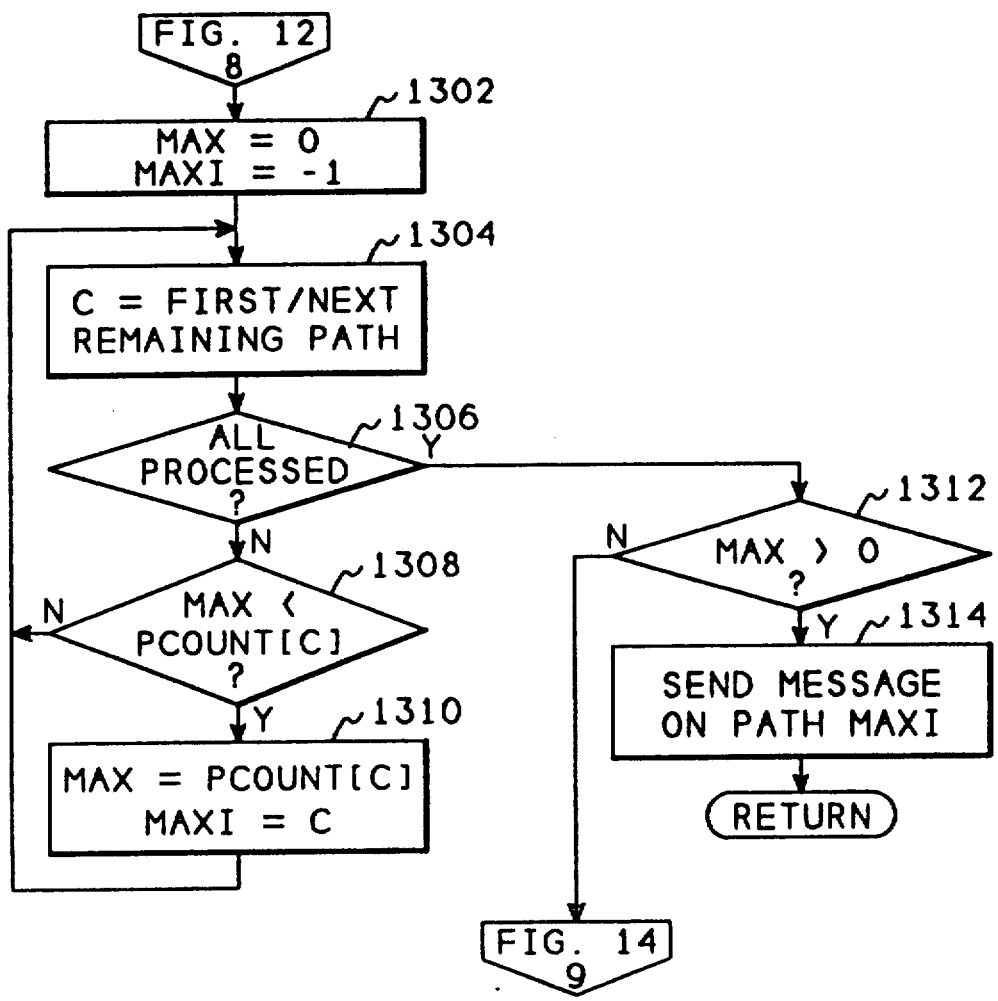
Figure 14:
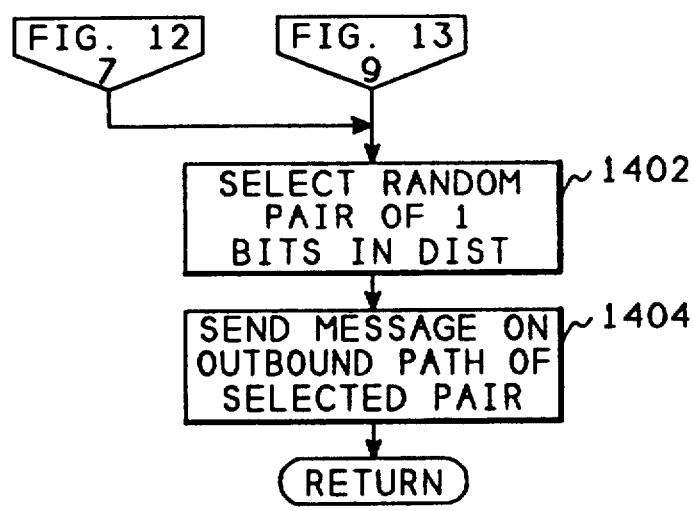

After all data communication paths have been processed, block 212 transfers to FIG. 13 block 1302. Block 1302 sets the value of a variable MAX to zero and the variable MAXI to −1. Block 1304 then sets the value of the variable C to the first or next remaining data communication path within the list created by blocks 1202 and 1206. Block 1306 then determines if all data communication paths have been processed and if not, transfers to block 1308 which determines whether the value of the variable MAX is less than the value of pcount[C]. If MAX is less than pcount[C], block 1308 transfers to block 1310 which sets MAX equal to the value of pcount[C], and also sets MAXI equal to C before returning to block 1304. After all data communication paths have been processed, block 1306 transfers to block 1312 Which determines whether MAX is greater than zero, that is, did any of the data communication paths satisfy the tests of block 1210 through block 1226. If MAX is not greater than zero, block 1312 transfers to FIG. 14 block 1402. If MAX is greater than zero, block 1312 transfers to block 1314 which sends the message on the data communication path defined by the variable MAXI before returning.

If none of the other tests defined in FIGS. 8 through 12 were successful in selecting a data communication path, control goes to block 1402 which selects a random pair of one bits within DIST. Block 1404 then sends the message on the outbound path of the selected data communication pair of paths.

Having thus described a presently preferred embodiment of the present invention, it will now be appreciated that the aspects of the invention have been fully achieved, and it will be understood by those skilled in the art that many changes in construction and circuitry and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

What is claimed is:

1. In a parallel processing computer system organized as a hypercube, having one data communication path at each node of the system corresponding to each binary bit position in the address of the node, and wherein each of the data communication paths can be programmed to transfer data in either outbound or inbound directions, a computer implemented method for programming the data transfer direction of the data communication paths of a node of said computer system, wherein all steps of said computer implemented method are performed in each node of said parallel processing computer system, said computer implemented method comprising the step of:

(a) determining the binary address of said node;

(b) for each bit within said binary address, determining a number s by using the equation $$s = \sum_{k=0}^{i/2-1} a_{2k+(i/2 \bmod 2 + 1) \bmod 2} + a_{i-(i \bmod 2)} + a_{i-(i \bmod 2)+1} + \sum_{k=i/2+1}^{(n-1)/2} a_{2k+i/2 \bmod 2} + i$$

wherein i is the bit position of said bit, numbered from right to left and wherein n is the dimension of the hypercube;

(c) if said number s is an odd number, programming said corresponding data communication path for inbound data whereby data will be transferred to said node on said data communication path; and (d) if said number s is an even number, programming said corresponding data communication path for outbound data whereby data will be transferred from said node on said data communication path.

2. In a parallel processing computer system organized as a hypercube, having one data communication path at each node of the system corresponding to each binary bit position in the address of the node, and wherein each of the data communication paths can be programmed to transfer data in either outbound or inbound directions, a computer implemented method for programming the data transfer direction of the data communication paths of a node of said computer system, wherein all steps of said computer implemented method are performed in each node of said parallel processing computer system, said computer implemented method comprising the steps of:
(a) determining the binary address of said node;
(b) for each bit within said binary address, determining a number s by using the equation $$s = \sum_{k=0}^{i/2-1} a_{2k+(i/2 mod2 +1) mod2} + a_{i-(i mod2)} + a_{i-(i mod2)+1} + \sum_{k=i/2+1}^{(n-1)/2} a_{2k+i/2 mod2} + i$$

wherein i is the bit position of said bit, numbered from right to left and wherein n is the dimension of the hypercube;
(c) if said number s is an even number, programming said corresponding data communication path for inbound data whereby data will be transferred to said node on said data communication path; and
(d) if said number s is an odd number, programming said corresponding data communication path for outbound data whereby data will be transferred from said node on said data communication path.

3. In a parallel processing computer system organized as a hypercube, having one data communication path at each node of the system corresponding to each binary bit position in the address of the node, a computer implemented method, which is performed in each node of said parallel processing computer system, for routing messages from a starting node to a destination node, said method comprising the steps of:
(a) forming a distance by exclusive or-ing a starting node address with destination node address;
(b) if said distance contains only a single binary one bit and a position of said single binary one bit corresponds to an outbound data communication path, selecting said outbound data communication path, and sending said message on said selected outbound data communication path;
(c) if a dimension of the hypercube is an odd number and said distance contains only a single binary one bit and a position of said single binary one bit corresponding to an inbound data communication path and the number of said dimension minus one corresponding to said inbound data communication path, selecting any outbound data communication path that corresponds to a zero bit in said distance, and sending said message on said selected outbound data communication path;
(d) if a dimension of the hypercube is an odd number and said distance contains a number of binary one bits equal to or less than half the dimension of the hypercube, and the number of said dimension minus one corresponds to an outbound data communication path, selecting said outbound data communication path, and sensing said message on said selected outbound data communication path;
(e) creating a first list of outbound data communication paths that correspond to a binary one bit in said distance;
(f) removing from said first list all outbound data communication paths paired with an inbound data communication path that corresponds to a binary one bit in said distance wherein a pair of data communication paths has a data communication path that corresponds to an odd numbered bit position and a data communication path that corresponds to a next lower numbered bit position in said distance;
(g) setting to zero an array value corresponding to each data communication path in said list;
(h) updating each of said array values comprising the steps of
(h1) selecting a data communication path from said first list,
(h2) creating a second list of data communication paths that correspond to a binary one bit in said distance,
(h3) removing said said selected second list said data communication path selected in step (h1),
(h4) selecting a data communication path from said second list,
(h5) inverting the bit in said starting node address that corresponds to said selected first list data communication path to create a next node address,
(h6) if the bit in said next node address that corresponds to said selected second list data communication path is a binary one and if said selected second list data communication path within a node having said next node address is outbound, incrementing said array value that corresponds to said selected first list data communication path, and
(h7) repeating steps (h4) through (h6) for each data communication path in said second list;
(i) repeating steps (g) through (h) for each data communication path in said first list;
(j) if any of said array values is greater than zero, selecting the data communication path that corresponds to a largest of said array values, and sending said message on said selected data communication path;
(k) creating a third list of outbound data communication paths that correspond to a binary zero bit in said distance;
(l) removing from said second list all outbound data communication paths paired with an inbound data communication path that corresponds to a binary zero bit in said distance wherein a pair of data communication paths has a data communication path that corresponds to an odd numbered bit position and a data communication path that corresponds to a next lower numbered bit position in said distance;
(m) setting to zero said array value corresponding to each data communication path in said list;
(n) updating each of said array values comprising the steps of
(n1) selecting a data communication path from said third list,
(n2) creating a fourth list of data communication paths that correspond to a binary one bit in said distance,
(n3) removing from said selected fourth list said data communication path selected in step (n1),
(n4) selecting a data communication path from said fourth list,
(n5) inverting the bit in said starting node address that corresponds to said selected third list data communication path to create a second next node address,
(n67) if the bit in said second next node address that corresponds to said selected fourth list data communication path in a binary one and if said selected fourth list data communication path within a second node having said second next node address is outbound, incrementing said array value that corresponds to said selected third list data communication path, and (n7) repeating steps (n4) through (n6) for each data communication path in said fourth list;

(o) repeating steps (m) through (n) for each data communication path in said third list;

(p) of any of said array values is greater than zero, selecting the data communication path that corresponds to a largest of said array values, and sending said message on said selected dat communication path; and (q) randomly selecting a data communication path corresponding to the outbound data communication path of a pair of data communication paths wherein a pair of data communication paths is a first data communication path having an odd numbered bit position and a second data communication path that corresponds to an ext lower numbered bit position in said distance, wherein said randomly chosen pair of data communication paths correspond to binary ones of said distance, and sensing said message on said selected data communication path.

4. In a parallel processing computer system organized as a hypercube, having one data communication path at each node of the system corresponding to each binary pit position in the address of the node, a computer implemented method, which is performed in each node of said parallel processing computer system, for selecting data paths and routing messages from a starting node to a destination node, said method comprising the steps of:

(a) forming a distance by exclusive or-ing a starting node address with destination node address; and (b) if said distance contains only a single binary one bit and a position of said single binary one bit corresponds to an outbound data communication path, selecting said dat a path, and sending said message on said selected outbound data communication path.

5. The computer implemented method of claim 4 further comprising the steps of:

(c) if a emission of the hypercube is an odd number and said distance contains only a single binary one bit and a position of said single binary one bit corresponds to an inbound data communication path and the number of said dimension minus one corresponds to said inbound data communication path, selecting any outbound data communication path that corresponds to a zero bit in said distance, and sending said message on said selected data communication path.

6. The computer implemented method of claim 5 further comprising the step of:

(d) if a dimension of the hypercube is an odd number and said distance contains a number of binary one bits equal to or less than half the dimension of the hypercube, and the number of said dimension minus one corresponds to an outbound data communication path, selecting said outbound data communication path, and sending said message on said selected outbound data communication path.

7. The computer implemented method of claim 6 further comprising the steps of:

(e) creating a first list of outbound data communication paths that correspond to a binary one bit in said distance;

(f) removing from said first list all outbound data communication paths paired with an inbound data communication path that corresponds to a binary one bit in said distance wherein a pair of data communication paths has a data communication path that corresponds to an odd numbered bit position and a data communication path that corresponds to a next lower numbered bit position in said distance;

(g) setting to zero an array value corresponding to each data communication path in said list;

(h) updating each of said array values comprising the steps of (h1) selecting a data communication path from said first list, (h2) creating a second list of data communication paths that correspond to a binary one bit in said distance, (h3) removing from said selected second list said data communication path selected in step (h1), (h4) selecting a data communication path from said second list, (h5) inverting the bit in said starting node address that corresponds to said selected first list data communication path to create a next node address, (n6) if the bit in said next node address that corresponds to said selected second list data communication path is a binary one and if said selected second list data communication path within a node having said next node address is outbound, incrementing said array value that corresponds to said selected first list data communication path, and (n7) repeating steps (h4) through (n6) for each data communication path in said second list;

(i) repeating steps (g) through (h) for each data communication path in said first list; and (j) if any of said array values is greater than zero; selecting the data communication path that corresponds to a largest of said array values, and sending said message on said selected data communication path.

8. The computer implemented method of claim 7 further comprising the steps of:

(k) creating a third list of outbound data communication paths that correspond to a binary zero bit in said distance;

(l) removing from said second list all outbound data communication paths paired with an inbound data communication path wherein a pair of data communication paths has a data communication path that corresponds to an odd numbered bit position and a data communication path that corresponds to a next lower numbered bit position in said distance;

(m) setting to zero said array value corresponding to each data communication path in said list;

(n) updating each of said array values comprising the steps of (n1) selecting a data communication path from said third list, (n2) creating a fourth list of data communication paths that correspond to a binary one bit in said distance, (n3) removing from said selected fourth list said data communication path selected in step (n1), (n4) selecting a data communication path from said fourth list, (n5) inverting the bit in said starting node address that corresponds to said selected third list data communication path to create a second next node address, (n6) if the bit in said second next node address that corresponds to said selected fourth list data communication path is a binary one and if said selected fourth list data communication path within a second node having said second next node address is outbound, incrementing said array value that corresponds to said selected third list data communication path, and (n7) repeating steps (n4) through (n6) for each data communication path in said fourth list;

(o) repeating steps (m) through (n) for each data communication path in said third list; and (p) if any of said array values is greater than zero, selecting the data communication path that corresponds to a largest of said array values, and sending said message on said selected data communications path.

9. The computer implemented method of claim 8 further comprising the step of:

(q) randomly selecting a data communication path corresponding to the outbound data communication path of a pair of data communication paths wherein a pair of data communication paths is a first data communication path having an odd numbered bit position and a second data communication path that corresponds to a next lower numbered bit position in said distance, and wherein said randomly chosen pair of data communication paths correspond to binary ones in said distance, and sending said message on said selected data communications path.

* * * * *